(12) United States Patent
Schlesener et al.

(10) Patent No.: US 8,818,365 B1
(45) Date of Patent: Aug. 26, 2014

(54) USER-INVOKED RE-ROUTING OF AN INCOMING CALL VIA A STRONGER SERVING SYSTEM

(75) Inventors: Matthew C. Schlesener, Shawnee, KS (US); Pallavur Sankaranaraynan, Overland Park, KS (US); Brian D. Mauer, Shawnee, KS (US); Sean A. Isaacson, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 2062 days.

(21) Appl. No.: 11/865,864

(22) Filed: Oct. 2, 2007

(51) Int. Cl.
*H04W 4/00* (2009.01)
*H04W 40/00* (2009.01)
*H04L 12/66* (2006.01)

(52) U.S. Cl.
USPC ............... 455/435.1; 455/445; 455/435.2; 370/352

(58) Field of Classification Search
USPC ..................................... 455/435.1
See application file for complete search history.

(56) References Cited

U.S. PATENT DOCUMENTS

| | | | | |
|---|---|---|---|---|
| 5,983,098 A | * | 11/1999 | Gersberg et al. | 455/426.1 |
| 6,519,454 B1 | * | 2/2003 | Calabrese et al. | 455/432.1 |
| 7,356,023 B2 | * | 4/2008 | Lowmaster | 370/352 |
| 2008/0014936 A1 | * | 1/2008 | Fang et al. | 455/435.1 |
| 2009/0005041 A1 | * | 1/2009 | Steinberg et al. | 455/435.2 |

* cited by examiner

*Primary Examiner* — Christopher M Brandt
*Assistant Examiner* — Muthuswamy Manoharan (57) ABSTRACT

A method, device, and system for re-routing an incoming call via a stronger serving system. When a wireless communication device such as a cell phone is receiving an incoming call via a first serving system with which it is registered, the device may detect that a second serving system (possibly a competing carrier's system) would provide improved signal strength. In response, the device may prompt its user to request the call be re-routed to the device via the other serving system. If the user approves, the device may then signal to the network to cause the call to be re-routed to the device, and the device may register with the new serving system. That way, as the network sets up the call to the device again, the call will extend via the new (improved signal strength) serving system to the device, thus reducing the likelihood of a call drop.

20 Claims, 5 Drawing Sheets

USER-INVOKED RE-ROUTING OF AN INCOMING CALL VIA A STRONGER SERVING SYSTEM

FIELD OF THE INVENTION

The present invention relates to wireless communications and, more particularly, to setting up of calls to wireless communication devices.

BACKGROUND

More people than ever are using wireless communication devices (WCDs), such as cellular telephones and personal digital assistants (PDAs), to connect to cellular wireless communication systems and other sorts of wireless networks. Through such networks, a mobile station may conveniently engage in voice and/or packet-data communications using a designated air interface protocol, such as CDMA (e.g., 1xRTT, 1xEV-DO, or 1xEV-DV), TDMA, GSM, AMPS, WiMAX, 802.11, BLUETOOTH, or any other protocol now known or later developed.

In general, a cellular wireless communication system operated by a wireless service provider or wireless carrier provides one or more radio access networks (RANs) that each include infrastructure arranged to facilitate wireless communication by served WCDs. A typical RAN includes at least one base transceiver station (BTS) comprising one or more antennas that radiate to define a cell, and perhaps cell sectors, in which WCDs can communicate with the RAN through a radio frequency (RF) air interface.

Each BTS may then be coupled with a base station controller (BSC) or similar entity that controls functions of the BTS and manages air interface functions such as handoff between sectors or cells for instance. Further, each BSC may then be coupled with a switch or gateway that provides connectivity with a transport network. For instance, the BSC may be coupled with a mobile switching center (MSC) or similar entity that provides connectivity with the public switched telephone network (PSTN), to allow suitably equipped WCDs to place and receive PSTN telephone calls. Likewise, the BSC may be coupled with a packet data gateway that provides connectivity with a packet-switched network such as the Internet, to allow suitably equipped WCDs to engage in packet-data communication.

Various different communication protocols well known to those of ordinary skill in the art define procedures for interaction between a WCD and a RAN, to facilitate management of air interface communications and management of calls or data sessions. For instance, protocols define how the air interface may be divided into control channels for control communication between the WCD and the RAN, and traffic channels for carrying bearer communication between the WCD and the RAN. Further, protocols define how calls (whether PSTN calls or data communications) can be set up to or from the WCD via the RAN.

Under the well known CDMA protocol, as defined by the CDMA2000 standard published by the Telecommunications Industry Association for instance, when a WCD first powers on or enters into coverage area of a RAN, the RAN registers with the RAN by sending a registration control message over the air to the RAN. The RAN then signals in turn with a home location register to record the presence of the WCD in the RAN, so that incoming calls can be routed to the WCD via the RAN. Thereafter, to initiate an outgoing communication via the RAN, the WCD may send a call origination message over the air to the RAN. The BSC of the RAN may then assign an air interface traffic channel for use by the WCD, and an MSC or packet-data gateway may set up the call via an appropriate transport network. Likewise, when a RAN receives a request to set up a call to a WCD, the RAN may send a page message over the air to the WCD, receive a page response over the air from the WCD, assign a traffic channel for use by the WCD, and send an alert/ring directive over the air to the WCD to cause the WCD to ring. When a user of the WCD answers the call, the WCD may then signal over the air to the RAN, and the RAN may connect the call through to the WCD.

Typically, each wireless coverage area (e.g., sector) in a RAN broadcasts a pilot signal over the air for receipt by WCDs, to enable WCDs to select one or more wireless coverage areas in which to operate. Under CDMA, for instance, a base station broadcasts a unique pilot signal in each of its sectors. Each served WCD then regularly scans the airwaves for pilot signals and measures the signal strength (e.g., ratio of energy to spectral interference, or $E_c/I_o$) of each received pilot signal. When the WCD detects a new pilot signal that is sufficiently stronger than the pilot signal of a wireless coverage area in which the WCD is currently operating, the WCD then automatically sends a reporting signal over the air to the RAN, to request a handoff to the new wireless coverage area.

Further, WCDs such as cell phones typically store a "preferred roaming list" (PRL), which includes a prioritized listing of wireless serving systems that the mobile station may access. A PRL enables a WCD to roam between wireless serving systems operated the WCD's wireless carrier as well as between wireless serving systems operated by competing wireless carriers.

As a general matter, a PRL can take any of a variety of forms. By way of example, a rudimentary PRL may take the form of a simple flat file listing or data table in which each entry corresponds with a respective system and indicates a radio frequency and system/network identifier for the system. Using such a PRL, a WCD may repeatedly sequence through the listed entries, for each entry scanning the indicated frequency in search of a pilot carrying the indicated identifier, and the WCD may register with the first (i.e., highest priority) system that it finds.

More typically, a PRL will include a separate "acquisition table" and "system table." The acquisition table may list frequencies to be scanned for allowed systems, and the system table may then provide a priority-ordered listing of allowed systems, specifying for each system an associated system identifier and/or network identifier. Under CDMA, for instance, each system table entry usually specifies a respective "system identification code" (SID) and "network identification code" (NID), and each CDMA base station broadcasts its SID and NID in system overhead messages. Thus, when a WCD detects an allowed SID-and-NID combination, the mobile station may connect to the identified system.

A wireless carrier will typically load an initial PRL onto its served WCDs at the time of device activation and may subsequently update the PRL through over-the-air signaling with the WCD. As the carrier exerts control over the PRL, the carrier will typically define the PRL in a manner that favors WCD operation in the carrier's own systems rather than in competitor systems. Thus, when a WCD is physically located in an area where service is available from both its own carrier's system and a competitor's system, the PRL may cause the WCD to register in and thus operate in its own carrier's system. On the other hand, if the WCD roams into an area where its own carrier does not provide service or where the signal strength from the carrier's serving system is too low in accordance with business rules defined by the PRL, the PRL may enable the WCD to detect, register and operate in a competitor system.

SUMMARY

The present invention is directed to a method, device, and system for handling a problem that arises in today's networks. When a WCD is operating in its own carrier's network but has low signal strength (e.g., if the WCD is at or near the outer edge of the carrier's coverage), if good signal strength is available from a competitor's network, the WCD could theoretically roam into the competitor's network. However, if the signal strength of the WCD's current serving system is not low enough, the WCD's preferred roaming list may dictate that the WCD remain in the carrier's system rather than roam to the competitor's system. As a result, if a user of the WCD then chooses to place or receive a call, there is a greater than normal chance that the call will be dropped due to low signal strength.

The present invention helps to overcome this problem by providing a mechanism through which a WCD user can manually override the PRL and force the WCD to operate in another system at the time of call setup. More particularly, when an incoming call is being set up to the WCD via a first wireless serving system (e.g., one operated by the WCD's own carrier), the WCD will detect that the signal strength it is receiving from the first wireless serving system is a threshold low level and that the signal strength it is receiving from a second wireless serving system (e.g., a competitor's system) is a threshold high level (or that the signal strength from the second system is sufficiently greater than the signal strength from the first system). In response, the WCD will then prompt a user of the WCD to opt for the incoming call (not yet connected) to be re-routed to the WCD via the stronger second wireless serving system instead. If the user opts to have the incoming call re-routed, the WCD will then invoke a process to re-route the incoming call to the WCD via the second wireless serving system.

The re-routing process can take various forms. In the exemplary embodiment, the process will involve (i) the WCD signaling to the first wireless serving system to cause the incoming call to be forwarded to a network server, such as a service node, and (ii) the WCD registering in the second wireless serving system, which will effectively de-register the WCD from the first wireless serving system. The network server would then be arranged to set up (forward, place, or otherwise extend) the call in turn to the WCD, which would occur via the second wireless serving system since the WCD would then be registered in the second wireless serving system.

These as well as other aspects, advantages, and alternatives will become apparent to those of ordinary skill in the art by reading the following detailed description, with reference where appropriate to the accompanying drawings. Further, it should be understood that the description provided in this summary and elsewhere in this document is intended to illustrate the invention by example only.

DETAILED DESCRIPTION

Referring to the drawings, as noted above, FIG. 1 is a simplified block diagram of a wireless communication system in which the exemplary embodiment can be implemented. For simplicity, the figure depicts two wireless serving systems 12, 14, each capable of serving a WCD 16. In practice, serving system 12 may be owned and operated by a wireless service provider to which WCD 16 subscribes, and serving system 14 may be owned and operated by another wireless service provider. Alternatively, the wireless serving systems may be co-owned and operated, i.e., by a single wireless service provider.

Figure 1:
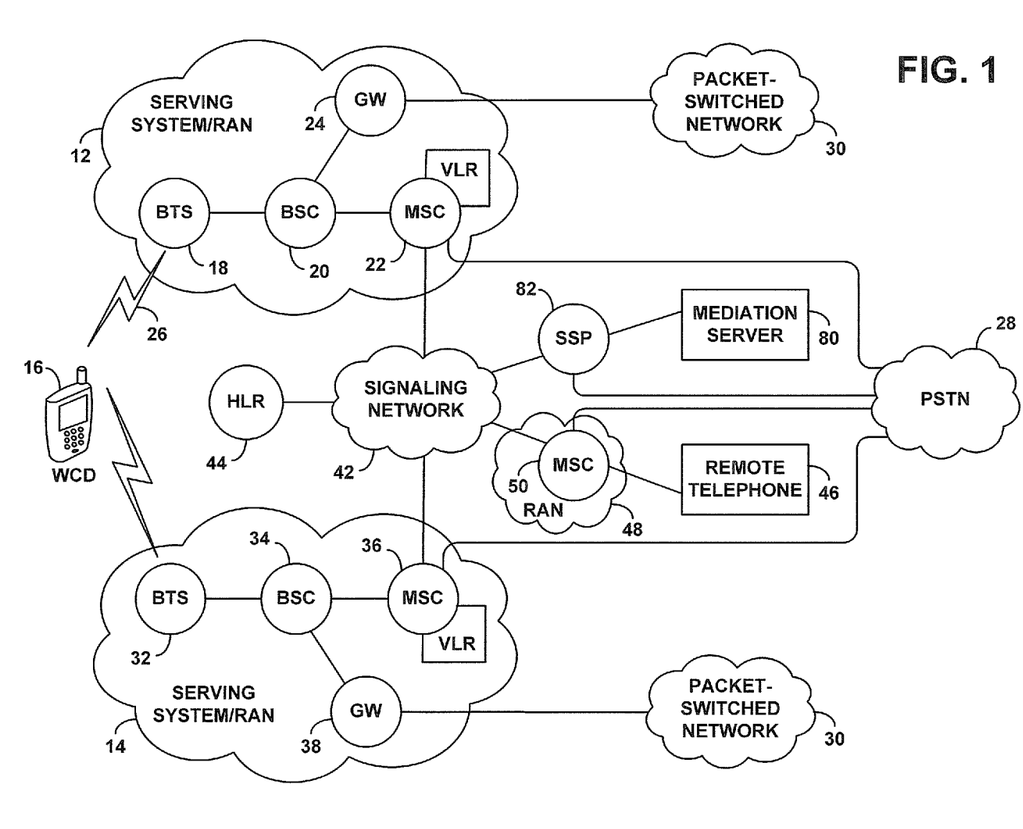
FIG. 1 is a simplified block diagram of a wireless communication system in which an exemplary embodiment of the invention can be implemented.

Each wireless serving system 12, 14 is shown defining a RAN that components such as those described above. In particular, the RAN of system 12 includes a BTS 18, a BSC 20, an MSC 22, and a packet-gateway (GW) 24. The BTS 18 radiates to define a radio frequency air interface 26 through which WCD 16 can communicate with the serving system 12. The BTS 18 is then coupled with the BSC 20, which controls functions of the BTS 18 and aspects of operation of the air interface 26 such as channel assignment and handoff. (In combination, the BTS 18 and BSC 20 may be considered a "base station" or "base station system.") The BSC 20 is in turn coupled with the MSC 22, which functions as a general RAN control entity and further provides connectivity with the PSTN 28. Additionally, the BSC 20 is coupled with GW 24, which provides packet-data connectivity, such as connectivity with the Internet or another packet-switched network 30.

Similarly, the RAN of system 14 includes a BTS 32, a BSC 34, an MSC 36, and a packet-gateway (GW) 38. The BTS 32 radiates to define a radio frequency air interface 40 through which WCD 16 can communicate with the serving system 14. The BTS 32 is then coupled with the BSC 34, which controls functions of the BTS 32 and aspects of operation of the air interface 40 such as channel assignment and handoff. (In combination, the BTS 32 and BSC 34 may likewise be considered a "base station" or "base station system.") The BSC 34 is in turn coupled with the MSC 36, which functions as a general RAN control entity and further provides connectivity with the PSTN 28. Additionally, the BSC 34 is coupled with GW 38, which provides packet-data connectivity, such as connectivity with the Internet or another packet-switched network 30.

Those of ordinary skill in the art will appreciate that the particular RAN configurations shown are merely examples, and the details of the RAN configurations (including the names, arrangements, and functions of various components) may depend on numerous factors, such as the communication protocols employed, for instance. For instance, although each serving system is shown including only one BTS, one BSC, and one MSC, a serving system could just as well have multiple BTSs, multiple BSCs, multiple MSCs, and other entities. As another example, a serving system could exclude one or more of these components and/or could include other components. Further, although the two wireless serving systems 12, 14 are shown having identical RAN configurations, in practice they could have different configurations and could in fact support disparate communication protocols. For instance, one RAN could provide CDMA service, while the other could provide service according to another protocol such as WiMAX or WiFi. Other arrangements are also possible.

In the arrangement shown, the MSCs of each RAN are further coupled with a signaling network 42, such as a Signaling System #7 (SS7) network for instance, and the signaling network 42 provides connectivity in turn with other switches and with a home location register (HLR) 44, among perhaps other entities.

As is well known in the art, the HLR maintains WCD profile records. When a WCD powers on or otherwise registers in a given wireless serving system, the serving system (e.g., the MSC) sends a registration message via the signaling network 42 to the HLR 44, and the HLR responsively updates the WCD profile to identify the system (e.g., MSC) currently that is serving the WCD. Further, the HLR then responsively provides the serving system with a copy of the WCD's service profile, which the serving system stores in a visitor location register (VLR) for reference by the MSC when serving the WCD. When the WCD thereafter moves into the coverage of another serving system and registers with the new serving system, this process repeats, with the HLR updating the WCD's profile records to identify the new serving system, thereby de-registering the WCD from the old serving system. Further, the HLR then signals to the old serving system to clear the old system's VLR record for the WCD.

The HLR record of which serving system is currently serving a WCD enables calls placed to the WCD to be routed to the proper serving system. In particular, when a switch receives a signaling message seeking to set up a call to a WCD, the switch sends a location-request message to the HLR, and the HLR responds with an indication of the WCD's current serving system, typically identifying a network address of the serving MSC. The switch then engages in signaling with the WCD's current serving switch, to set up the call to the WCD.

As further shown, PSTN 28 provides connectivity with a remote telephone 46, via another RAN 48 including a respective MSC 50. Alternatively, the remote telephone could just as well be a landline telephone coupled to the PSTN via a conventional service switching point (SSP), or the remote telephone could be served by one of the other RANs shown. MSC 50 is in turn, also coupled with the signaling network 42, to enable the MSC 50 to engage in signaling with the HLR and with other switches.

With the arrangement shown, when WCD 16 is registered in either one of the serving systems 12, 14, a telephone call can be established between WCD 16 and the remote telephone device 46 via the serving system and the PSTN 28 (e.g., voice trunks and other entities coupling the various switches). Likewise, the WCD 16 may be equipped to engage in packet-data communication with entities on the packet-switched network, also via either one of the serving systems.

In exemplary operation under CDMA2000, for instance, when a user of WCD 16 dials a call to a telephone 46, the WCD responsively sends a call origination message over an air interface access channel to its serving RAN. The MSC of the RAN then engages in signaling (e.g., well known "ISUP" signaling) with remote MSC 50 via the signaling network 42 in an effort to set up the call, and the serving MSC directs the serving base station to assign an air interface traffic channel for use by the WCD. Upon successful setup of the call via PSTN to telephone 46, the serving MSC then couples the call via the assigned air interface traffic channel with the WCD, and the call may proceed.

Similarly, when a user telephone 46 calls WCD 16, MSC 50 (or a home switch associated with the WCD 16) queries the HLR to identify the switch currently serving the WCD 16, and call setup signaling would then proceed via the signaling network 42 with the serving MSC. Upon receipt of a call setup request, the serving MSC then directs the serving base station to page the WCD 16, and the base station transmits a page message over the air to the WCD. Upon receipt of the page message, the WCD then returns a page response to the base station, and the base station responsively notifies the serving MSC.

In turn, the serving MSC then directs the base station to assign an air interface traffic channel for use by the WCD, and the base station engages in control signaling with the WCD to do so. Thereafter, the base station then sends an alert message with caller-ID information (e.g., identifying the name and telephone number of the calling party) to the WCD, which causes the WCD to present a call alert (e.g., ring) and to display the caller-ID information. When a user of the WCD answers the call, the WCD then sends a connect message to the base station, and the base station notifies the MSC. The MSC then connects the call through to the WCD, and the call may proceed.

In the arrangement of FIG. 1, each BTS includes antennas that radiate to define one or more wireless coverage areas, such as cell sectors. In each wireless coverage area, the BTS then preferably broadcasts a unique pilot signal or other like, which distinguishes the coverage area from other coverage areas and preferably distinguishes the serving system from other serving systems. As described above, devices such as WCD may then monitor the airwaves for these pilot signals in order to determine where to register and thus where to operate.

For example, when WCD 16 first powers on or enters into a wireless coverage area defined by BTS 18 of serving system 12, WCD 16 may detect a pilot signal of that coverage area and may responsively send a registration message over the air to serving system 12, to register in that coverage area and in serving system 12. Calls placed to the WCD would then be routed via serving system 12 to the WCD as described above.

If the WCD 16 then moves away from BTS 18 and approaches BTS 32 of serving system 14, the WCD may begin to detect decreased pilot signal strength from BTS 18 as the WCD detects increased pilot signal strength from a coverage area of BTS 32. At some point, if the pilot signal strength from BTS 32 becomes sufficiently stronger than the pilot signal strength from BTS 18, the WCD may then newly register via BTS 32 with serving system 14, which, as described above would effectively de-register the WCD from serving system 12. Given the WCD's new registration in serving system 14, calls placed to the WCD would then be routed via serving system 14 to the WCD.

This process of handing off WCD 16 from one serving system to another can occur between serving systems operated by the same wireless service provider. Further, largely the same process can occur between serving systems operated by different wireless service providers. For instance, if serving system 12 is operated by one wireless carrier (e.g., the carrier to which the WCD subscribes) and serving system 14 is operated by another wireless carrier (e.g., a competing carrier), the WCD may apply its PRL, to detect a sufficient pilot signal strength from serving system 14 when the WCD has detected a sufficient decrease in pilot signal strength from serving system 12. At that point, the WCD may then begin roaming by registering with serving system 14. Calls placed to the WCD would then be routed through the competing carrier's network and via serving system 14 to the WCD.

Figure 2:
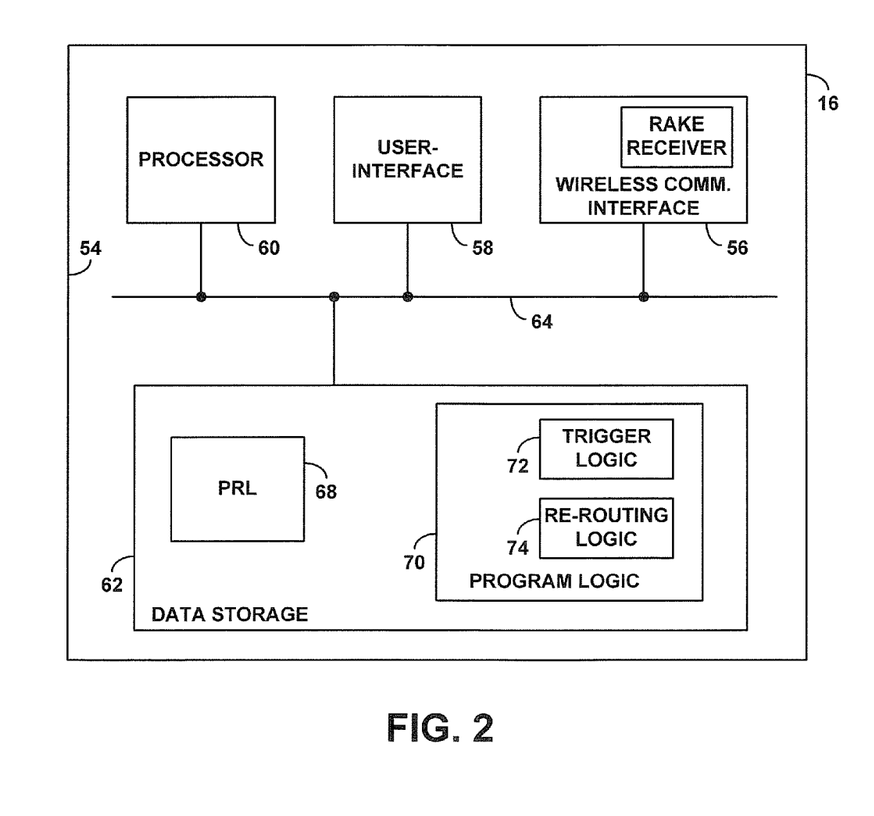
FIG. 2 is a simplified block diagram of a wireless communication device operable within the exemplary embodiment.

FIG. 2 is next a simplified block diagram of WCD 16, showing components that can be included in the WCD in accordance with the exemplary embodiment. As shown, the exemplary WCD includes within a device housing 54 a wireless communication interface 56, a user interface 58, a processor 60, and data storage 62, all of which may be coupled together by a system bus or other connection mechanism 64.

Wireless communication interface 56 functions to facilitate air interface communication according to one or more protocols such as those noted above. In the preferred embodiment, wireless communication interface 56 supports CDMA communication. As such, the wireless communication interface 56 preferably includes a transceiver having a rake receiver 66 of the type well known in the art, which enables WCD 16 to scan the airwaves in search of CDMA encoded pilot signals and to measure the strength of those signals. An exemplary wireless communication interface is an MSM series chipset manufactured by Qualcomm Incorporated, together with one or more internal or external antennas.

User interface 58 includes components for receiving input from a user of WCD and providing output to a user of the WCD. For instance, the user interface may include a keypad, touch-sensitive screen, microphone, and camera for receiving user input, and a display screen and speaker for providing user output. Further, the user interface 58 may include analog/digital conversion circuitry to facilitate conversion between analog user input/output and digital signals on which the WCD can operate.

Processor 60 comprises one or more general purpose processors (such as INTEL processors or the like) and/or one or more special purpose processors (such as digital signal processors or application specific integrated circuits), and may be integrated with the wireless communication interface 56. If processor 60 includes more than one processor, the processors could work separately or in combination (e.g., in parallel). Data storage 62, in turn, comprises one or more volatile or non-volatile storage components, such as optical, magnetic, or organic storage, and data storage 62 can be integrated in whole or in part with processor 60.

As shown, data storage 62 of the exemplary WCD includes, among other data, a PRL 68 and program logic 70. Alternatively, the PRL and perhaps aspects of the program logic may be stored within memory of the wireless communication interface 56 or elsewhere in WCD.

In the exemplary embodiment, the PRL 68 is arranged in a conventional manner, listing various networks/systems to which WCD 16 can tune in order to search for pilot signals or the like. For sake of example, the PRL can be assumed to list the network/system of serving system 12 separately from the network/system of serving system 14, as those serving systems may be operated by different wireless carriers. Thus, in practice, the WCD may scan the airwaves in a priority order defined by the PRL, in search of pilot signals. And the PRL may define business rules indicating threshold signal strengths when the WCD could roam in a competing carrier's network.

Program logic 70, in turn, may take the form of machine language instructions or other program instructions that are executable by processor 60 to carry out various WCD functions described herein. Alternatively, some or all of the various WCD functions can be implemented by hardware, firmware, and/or other logic.

As discussed above, the present invention addresses the problem that can arise when a WCD has low signal strength in one serving system but when the signal strength is not low enough to trigger a handoff of the WCD to another serving system. This can occur, by way of example, if the first serving system is operated by the wireless carrier to which the WCD subscribes and the second serving system is operated by a competing carrier, and if the business rules underlying the WCD's PRL dictate that the signal strength being received by the WCD in the first serving system is not low enough to justify roaming into the competitor's system. As explained above, the problem in this scenario is that if the WCD engages in a call with low signal strength in its home system, the call is more likely than normal to drop.

To help avoid this problem, as noted above, the WCD will be arranged to detect relatively low signal strength in its current serving system and relatively high signal strength in another (e.g., competitor's) serving system, and, when faced with an incoming call, will give the user an option to have the call be re-routed to the WCD via the other system. In effect, the WCD will thus allow a user to manually override business rules that would have kept the incoming call in the current serving system, by forcing the incoming call to instead be re-routed to the WCD via the other system.

For instance, it may be that the business rules underlying the WCD's PRL dictate that the WCD can roam to a competitor's system only if the signal strength in the current system reaches a certain low level, L, and/or only if the signal strength in the competitor's system reaches a certain high level, H. Yet, according to the logic of the present invention, the WCD may apply one or more manual override thresholds that are not as extreme as those defined by the PRL, such as a low level threshold of $L+n$, and/or a high level threshold of $H-m$. Thus, for example, when faced with an incoming call in the current serving system, the WCD may offer the user an opportunity to have the call re-routed to the other system in response to the less extreme threshold signal strength condition.

To facilitate forced re-routing of an incoming call in accordance with the exemplary embodiment, the program logic 70 of WCD 16 preferably includes trigger logic 72 and re-routing logic 74, and the system of FIG. 1 is preferably equipped with a mediation server 74 that will function to receive the incoming call being re-routed and to set up the incoming call again to the WCD via the new serving system.

In particular, the trigger logic 72 is executable by the WCD processor 60 (i) to detect, during set up of an incoming call to the WCD via a first wireless system with which the WCD is currently registered, that the incoming call can instead be set up to the WCD via a second wireless serving system, and (ii) to responsively offer a user of the WCD an option to have the incoming call re-routed to the WCD via the second wireless serving system instead of via the first wireless serving system, and (iii) to respond to user acceptance of the offer by invoking the re-routing logic.

The re-routing logic 74 is then executable by the WCD processor (i) to signal to the first wireless serving system to forward the incoming call to a mediation server 80, and (ii) to register with the second wireless serving system, so as to facilitate receiving the incoming call from the mediation server 80 via the second wireless serving system.

As shown in FIG. 1, the mediation server 80 may be coupled to the PSTN 28 via a switch, shown as an SSP 82, which is also coupled with the signaling network 42, so as to facilitate set up of the re-routing call to the mediation server and then extending the call in turn from the mediation server to the WCD (via the new serving system). Alternatively, the mediation server could be coupled more directly to one of the MSCs or could otherwise be linked with the PSTN and/or with other entities shown to facilitate these functions.

Preferably, the mediation server 80 includes a processor, and data storage with program instructions executable by the processor to carry out the mediation server functions described herein, such as receiving a call, holding the call for a time period sufficient to allow the WCD to register with a new serving system, and then setting up the call to the WCD such as by placing a new call to the WCD and bridging the received call with the outgoing call.

The mediation server 80 could be structured as a server class computer. Alternatively, the mediation server could take the form of an application programmed on a service node, in much the same way that a pre-paid call processing engine is known to be programmed on a service node. The mediation server can take still other forms as well.

Figure 3:
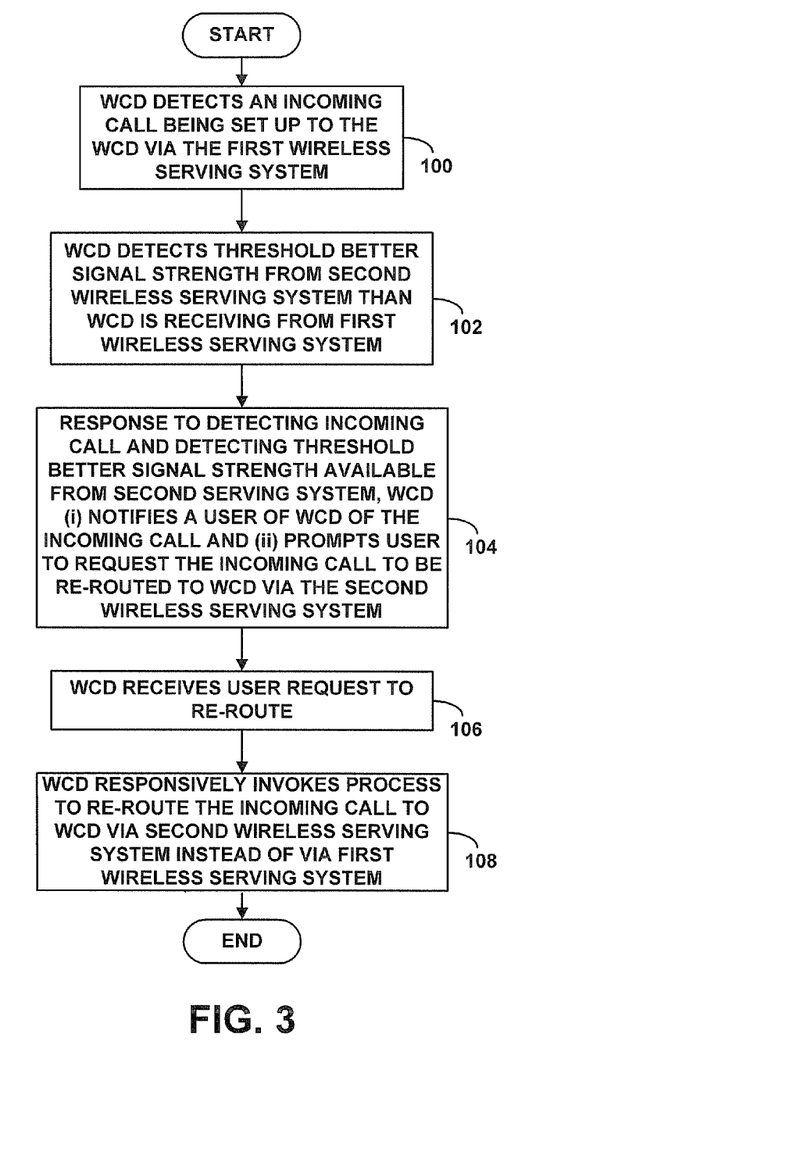
FIG. 3 is a flow chart depicting functions that can be carried out in accordance with the exemplary embodiment.
Figure 4:
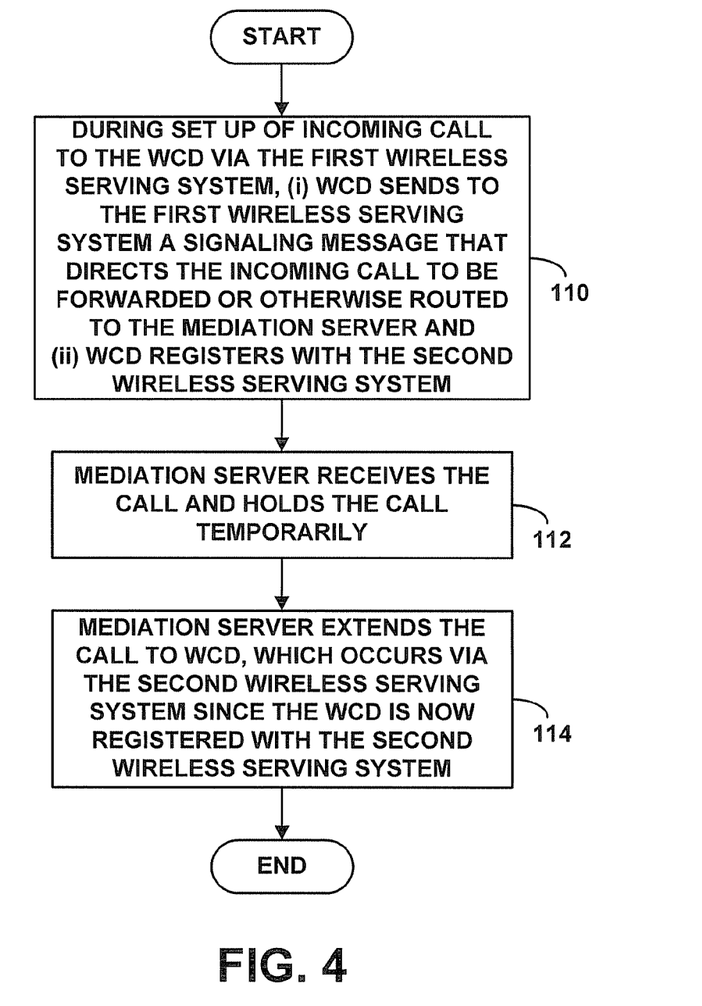
FIG. 4 is another flow chart depicting functions that can be carried out in accordance with the exemplary embodiment.

FIGS. 3 and 4 are next flow charts depicting functions that can be carried out in accordance with the exemplary embodiment, in order to implement forced re-routing of an incoming call. The process of FIG. 3 occurs when a WCD is registered with a first wireless serving system and is thus being served by the first wireless serving system via a first air interface between the first wireless serving system and the WCD.

As shown in FIG. 3, at step 100, the WCD detects an incoming call being set up to the WCD via the first wireless serving system. For instance, the WCD may receive from the first wireless serving system at least one control signal, such as a page message and/or an alert message, indicative of the incoming call. Receipt of a page message could cause the WCD to begin evaluating pilot signal strengths for purpose of determining whether to offer the user a chance to re-route the call. And subsequent receipt of an alert message could cause the WCD to then prompt the user to request the call to be re-routed.

At step 102 (which may occur before or concurrently with step 100, or after step 100), the WCD detects a threshold low signal strength being received into the WCD from the first wireless serving system and a threshold high signal strength being received into the WCD from a second wireless serving system. For instance, the WCD may refer to its most recent pilot signal measurements obtained by scanning nearby pilots in systems listed in its PRL, and the WCD may detect that its received signal strength from the first wireless serving system is less than or equal to the threshold low signal strength and its received signal strength from the second wireless serving system that is greater than or equal to the threshold high signal strength. (In this regard, the threshold high signal strength can be any signal strength that is at least a predefined extent higher than the threshold low signal strength, where the predefined extent is a matter of design choice.) Alternatively, the WCD may in some other manner determine that the second wireless serving system may be better suited to handle the incoming call.

At step 104, responsive to detecting the incoming call being set up to the WCD via the first wireless serving system and detecting the threshold low signal strength being received into the WCD from the first wireless serving system and a threshold high signal strength being received into the WCD from a second wireless serving system, the WCD (i) notifies a user of the WCD of the incoming call and (ii) prompts the user to request the incoming call to be re-routed to the WCD via the second wireless serving system instead of via the first wireless serving system.

Figure 5A:
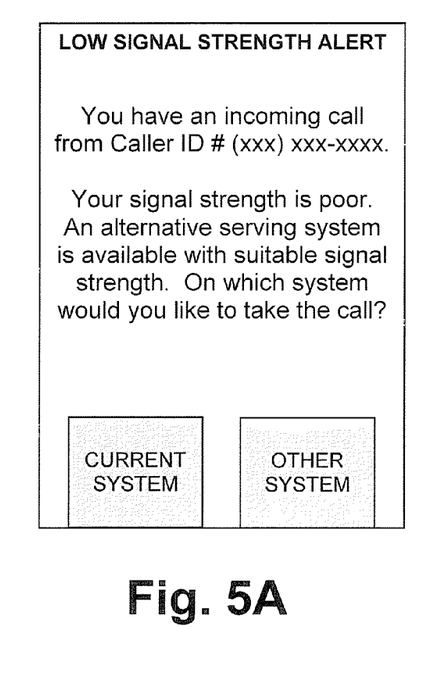
FIGS. 5A and 5B depict notification messages that a wireless communication device can present in accordance with the exemplary embodiment.

For example, the WCD may present on a display screen of its user interface 58 a notification message such as that illustrated in FIG. 5A. As shown there, the notification message may provide a textual indication of the incoming call, specifying caller-ID information for the incoming call. Further, the notification message preferably informs the user that better signal quality is available on the second wireless serving system and prompts the user to indicate whether to accept the incoming call via the first wireless serving system or to re-route the incoming call via the second wireless serving system. The notification message may define two soft-key options: (i) USE CURRENT SYSTEM or (ii) USE OTHER SYSTEM. And the user may select the desired option (e.g., with the WCD keypad or touch-sensitive screen) so as to provide a response to the WCD.

Figure 5B:
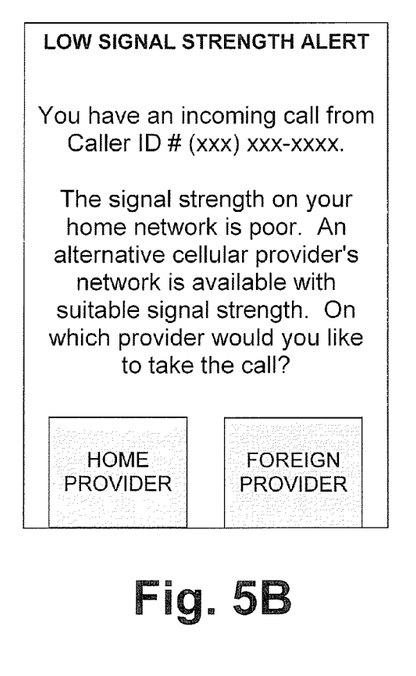

In a scenario where other (better quality) system is a competing provider's system (particularly where it would cost more for the call to be set up with roaming through the competitor's system), the notification message may explain that, in order to let the user make an educated decision of whether to have the call be re-routed. In that case, the notification message may appear as shown in FIG. 5B, offering the user the option to have the call be connected through an alternative carrier's network.

At step 106, the WCD then receives from the user, in response to the prompting, a request to re-route the incoming call to the WCD via the second wireless serving system. And at step 108, responsive to the user's request, the WCD invokes the process to re-route the incoming call to the WCD via the second wireless serving system instead of via the first wireless serving system.

FIG. 4 next depicts exemplary steps that can be involved in invoking and carrying out the re-routing process, responsive to the user's request received at step 108 in FIG. 3. A shown in FIG. 4, at step 110, during set up of the incoming call to the WCD via the first wireless serving system, (i) the WCD sends to the first wireless serving system a signaling message that directs the incoming call to be forwarded or otherwise routed to the mediation server 80 and (ii) the WCD registers with the second wireless serving system.

The signaling message that the WCD sends to the first serving system to direct routing of the call to the mediation server 80 can take various forms. Under the CDMA2000 protocol, for instance, the message can be a "Flash With Information" message, which the WCD can send after receiving an alert (e.g., "Alert with Info") message for an incoming all. The Flash With Information message would carry an indication that the incoming call should be forwarded to the mediation server (e.g., to a predefined telephone number of the mediation server). In response to receipt of the Flash With Information message, the MSC of the first serving system will initiate "network initiated call clearing," through which the MSC clears resources that had been devoted for the incoming call. Further, the MSC forwards the call to the mediation server 80, by engaging in call setup signaling with switch 82 for instance.

In the preferred embodiment, at step 112, the mediation server 80 may then answer the call and play a message to the caller indicating that the call is being connected, or the mediation server 80 may simply hold the call. In any event, the mediation server 80 may wait a predefined period of time before then setting up the call to the WCD again, with the predefined period of time being just long enough to allow the WCD to complete its registration with the second serving system.

At step 114, the mediation server may then extend the call to the WCD. For instance, the WCD may place a new outgoing call to the WCD, with the dialed number having been indicated in ISUP and caller-ID signaling and thus known by the mediation server 80. Alternatively, the WCD may in some other manner engage in signaling to extend the call to the WCD. In one variation, for instance, the mediation server could be provided as application logic on a switch, and the process of extending the call to the WCD could involve the switch simply setting up a call leg to the WCD and the bridging the original leg with the newly set up leg.

As the WCD had registered with the second serving system at this point, the call extended from the mediation server to the WCD will be set up to the WCD via the second serving system, rather than via the first serving system. In particular, a switch setting up the call may query the HLR to determine the MSC currently serving the WCD (namely, the MSC of the second serving system), and switch may then set up the call to the WCD by engaging in signaling with that serving MSC. Thus, in the end, the incoming call will arrive at the WCD via the second serving system rather than via the first serving system. And ideally, the signal strength in the second serving system will be high enough to support the call.

An exemplary embodiment of the present invention has been described above. Those skilled in the art will understand, however, that changes and modifications may be made to this embodiment without departing from the true scope and spirit of the present invention, which is defined by the claims.

We claim:

1. A wireless communication device (WCD) comprising:
a processor;
data storage;
trigger logic stored in the data storage;
re-routing logic stored in the data storage;
wherein the trigger logic is executable by the processor (i) to detect, during set up of an incoming call to the WCD via a first wireless serving system with which the WCD is currently registered, that the incoming call can instead be set up to the WCD via a second wireless serving system, and (ii) to responsively offer a user of the WCD an option to have the incoming call re-routed to the WCD via the second wireless serving system instead of via the first wireless serving system, and (iii) to respond to user acceptance of the offer by invoking the re-routing logic,
wherein the re-routing logic is executable by the processor (i) to signal to the first wireless serving system to forward the incoming call to a mediation server, and (ii) to register with the second wireless serving system, so as to facilitate receiving the incoming call from the mediation server via the second wireless serving system.

2. The WCD of claim 1, wherein the trigger logic is executable to detect that the incoming call can instead be set up to the WCD via a second wireless serving system by detecting that threshold stronger signal strength is available from the second wireless serving system than the WCD is receiving from the first wireless serving system.

3. The WCD of claim 1, wherein the first wireless serving system is operated by a first wireless service provider, and the second wireless serving system is operated by a second wireless service provider.

4. In a wireless communication device (WCD) registered with a first wireless serving system and being served by the first wireless serving system via a first air interface between the first wireless serving system and the WCD, a method comprising:
detecting an incoming call being set up to the WCD via the first wireless serving system;
detecting a threshold low signal strength being received into the WCD from the first wireless serving system and a threshold high signal strength being received into the WCD from a second wireless serving system;
responsive to detecting the incoming call being set up to the WCD via the first wireless serving system and detecting the threshold low signal strength being received into the WCD from the first wireless serving system and a threshold high signal strength being received into the WCD from a second wireless serving system, (i) notifying a user of the WCD of the incoming call and (ii) prompting the user to request the incoming call to be re-routed to the WCD via the second wireless serving system instead of via the first wireless serving system;
receiving from the user, in response to the prompting, a request to re-route the incoming call to the WCD via the second wireless serving system; and
responsive to the user's request, invoking a process to re-route the incoming call to the WCD via the second wireless serving system instead of via the first wireless serving system,
wherein invoking the process to re-route the incoming call to the WCD via the second wireless serving system instead of via the first wireless serving system comprises (a) during set up of the incoming call to the WCD via the first wireless serving system, (i) sending from the WCD to the first wireless serving system a Flash With Information message directing the incoming call to be forwarded to a mediation server, and (ii) registering with the second wireless serving system, wherein the mediation server then sets up the incoming call to the WCD, and the call connects to the WCD via the second wireless serving system since the WCD is registered with the second wireless serving system.

5. The method of claim 4, wherein the first wireless serving system is operated by a first wireless service provider, and the second wireless serving system is operated by a second wireless service provider.

6. The method of claim 4, wherein detecting the incoming call being set up to the WCD via the first wireless serving system comprises receiving into the WCD from the first wireless serving system at least one control signal indicative of the incoming call.

7. The method of claim 6, wherein the at least one control signal comprises an alert message providing the WCD with caller-ID information for the incoming call.

8. The method of claim 4, wherein detecting the threshold low signal strength being received into the WCD from the first wireless serving system and the threshold high signal strength being received into the WCD from a second wireless serving system comprises:
detecting that, when the incoming call is being set up to the WCD via the first wireless serving system, the WCD has a received signal strength from the first wireless serving system that is less than or equal to the threshold low signal strength and the WCD has a received signal strength from the second wireless serving system that is greater than or equal to the threshold high signal strength.

9. The method of claim 4, wherein detecting the threshold low signal strength being received into the WCD from the first wireless serving system and the threshold high signal strength being received into the WCD from a second wireless serving system comprises:
receiving a first pilot signal from the first wireless serving system, determining a first strength of the first pilot signal, and determining that the first strength is less than or equal to the threshold low signal strength; and
receiving a second pilot signal from the second wireless serving system, determining a second strength of the second pilot signal, and determining that the second strength is greater than or equal to the threshold high signal strength.

10. The method of claim 4, wherein the WCD maintains a preferred roaming list (PRL) that designates wireless serving systems including the first wireless serving system and the second wireless serving system, wherein the WCD scans for pilot signals from wireless serving systems designated by the PRL, and wherein:

detecting the threshold low signal strength being received into the WCD from the first wireless serving system comprises scanning the first wireless serving system in accordance with the PRL and detecting the threshold low signal strength being received into the WCD from a pilot signal of the first wireless system, and     detecting the threshold high signal strength being received into the WCD from the second wireless serving system comprises scanning the second wireless serving system in accordance with the PRL and detecting the threshold high signal strength being received into the WCD from a pilot signal of the second wireless system.

11. The method of claim 4, wherein notifying a user of the WCD of the incoming call and prompting the user to request the incoming call to be re-routed to the WCD via the second wireless serving system comprises:

presenting on a display screen of the WCD a notification message for viewing by the user, the notification message providing a textual indication of the incoming call, specifying caller-ID information for the incoming call, informing the user that better signal quality is available on the second wireless serving system, and prompting the user to indicate whether to accept the incoming call via the first wireless serving system or to re-route the incoming call via the second wireless serving system.

12. The method of claim 11, wherein receiving the request from the user in response to the prompting comprises receiving user input in response to the notification message.

13. The method of claim 4, wherein the threshold high signal strength is any signal strength that is at least a predefined extent higher than the threshold low signal strength.

14. A system for forced handoff of a call that is being set up to a wireless communication device (WCD) via a first wireless serving system with which the WCD is currently registered, the system comprising:

trigger logic in the WCD;
    re-routing logic in the WCD; and
    a mediation server,
    wherein the trigger logic is operable by the WCD (i) to detect, during set up of the incoming call, that threshold stronger signal strength is available from a second wireless serving system than the WCD is receiving from the first wireless serving system, (ii) to responsively offer a user of the WCD an option to have the incoming call re-routed to the WCD via the second wireless serving system instead of via the first wireless serving system, and (iii) to respond to user acceptance of the offer by invoking the re-routing logic,
    wherein the re-routing logic is operable by the WCD (i) to signal to the first wireless serving system to forward the incoming call to the mediation server, (ii) to register with the second wireless serving system, so as to facilitate receiving the incoming call from the mediation server via the second wireless serving system, and
    wherein the mediation server operates to set up the incoming call to the WCD, whereby the incoming call then extends from the mediation server to the WCD via the second wireless serving system.

15. The system of claim 14, wherein the trigger logic and re-routing logic each comprise program instructions stored in data storage of the WCD and executable by a processor of the WCD.

16. The system of claim 14, wherein the WCD maintains a preferred roaming list (PRL) designating various wireless serving systems including the first wireless serving system and the second wireless serving system, and wherein the trigger logic is operable by the WCD to detect that threshold stronger signal strength is available from the second wireless serving system than the WCD is receiving from the first wireless serving system by scanning pilots in accordance with the PRL and by detecting that a pilot signal received by the WCD from the second wireless serving system is at least a predefined threshold extent stronger than a pilot signal received by the WCD from the first wireless serving system.

17. The system of claim 14, wherein the re-routing logic is operable to send a Flash With Information signal to the first wireless serving system directing the call to be forwarded to the mediation server.

18. The system of claim 14, wherein the first wireless serving system is operated by a first wireless service provider, and the second wireless serving system is operated by a second wireless service provider.

19. The system of claim 14,
    wherein the WCD receives from the first wireless serving system a call setup signal indicative of the incoming call, the call setup signal providing caller-ID information for the incoming call, and
    wherein the trigger logic is operable to offer the user of the WCD the option to have the incoming call re-routed to the WCD via the second wireless serving system instead of via the first wireless serving system, by presenting on a display screen of the WCD a message (i) describing the incoming call, including the caller-ID information, and (ii) prompting the user to opt for the call to be re-routed to the WCD via the second wireless serving system instead of via the first wireless serving system.

20. The system of claim 14, wherein the mediation server is operable to wait at least a predefined period of time upon receipt of the forwarded incoming call before setting up the incoming call to the WCD, wherein the predefined period of time is a time period sufficient to allow for the WCD to finish deregistering from the first wireless serving system and registering with the second wireless serving system.

\* \* \* \* \*